United States Patent [19]

Buckley

[11] Patent Number: 4,987,015

[45] Date of Patent: Jan. 22, 1991

[54] HEAT RESISTANT SYNTHETIC PLASTICS MATERIALS

[75] Inventor: Roy W. Buckley, Halberton, England

[73] Assignee: John Heathcoat & Company Limited, Devon, England

[21] Appl. No.: 200,528

[22] Filed: May 31, 1988

[30] Foreign Application Priority Data

Jun. 2, 1987 [GB] United Kingdom ................. 8712903

[51] Int. Cl.$^5$ .............................................. B05D 3/02
[52] U.S. Cl. .................................. 427/389.9; 427/394; 428/474.4; 428/480; 428/394; 428/395; 428/396; 525/420; 525/437

[58] Field of Search ..................... 428/477.4, 480, 394, 428/395, 396, 475.5, 477.4, 480, 524, 272; 525/420, 437; 427/389.9, 394

[56] References Cited

U.S. PATENT DOCUMENTS 3,987,004 10/1976 Georgoudis .......................... 524/87

*Primary Examiner*—George F. Lesmes
*Assistant Examiner*—D. R. Zirker
*Attorney, Agent, or Firm*—Larson and Taylor

[57] ABSTRACT

A method of imparting heat resisting properties to synthetic plastics materials comprises incorporating in the material an organic antioxidant each molecule of which contains a reactive hydrogen atom and does not become an oxidation radical when the hydrogen atom is replaced by a free radical obtained from the polymer.

6 Claims, No Drawings

HEAT RESISTANT SYNTHETIC PLASTICS MATERIALS

This invention relates to a method of imparting heat resisting properties to synthetic plastics materials such as polyamides (particularly nylon 66) and polyesters so that articles made of such materials can work for prolonged periods at elevated temperatures, e.g. temperatures for nylon 66 up to at least 140° C. and temperatures higher than that for other synthetic materials such as polyester.

The invention also relates to heat resistant articles of synthetic materials rendered heat resistant by the method of the invention. Examples of such articles are yarns, fabrics formed from such yarns and moulded articles such as bearings and bearing liners for rotating and sliding shafts and loose stock fibres.

It is known to increase the wearing properties of some synthetic plastics materials particularly nylon by adding to the melt before it is extruded various soluble inorganic salts such as copper acetate and potassium iodide. In the case of nylon fabric it is often found or considered to be necessary to remove impurities and develop or enhance bulking of the nylon yarn and this is customarily done by aqueous scouring the nylon before it is placed in a mould in which a fabric reinforced article is to be formed. Well known scouring materials are soda ash and a non-ionic detergent, usually applied in admixture. Unfortunately the scouring treatment removes added soluble inorganic salts and thus militates against any substantial increase in the wearing properties of nylon at high temperature which the retention of such soluble inorganic salts might have imparted. Where such synthetic plastics materials containing copper and magnesium salts are bonded to rubber there is evidence which suggests that the copper and magnesium salts catalyse and accelerate degradation of the rubber.

Some synthetic plastics materials such as polyamides as customarily formed have only a short operating life at elevated temperature. Ths short operating life is the result of attack by atmospheric oxygen at elevated temperatures. The oxygen causes a progressive breakdown of the polymer chains into a progressively increasing number of free radicals which are themselves active in promoting a further and accelerating breakdown of the polymer chains.

It is an object of the present invention to provide a method of treating synthetic materials such as polyamides and polyesters and articles made from such materials to cause them to maintain a sufficiently high proportion of their strength and durability over long periods at elevated temperatures to make them suitable for prolonged use in high temperature environments where previously known products would degrade within a few days. It is also an object of the invention to provide synthetic materials such as polyamides and polyesters and articles made from such materials which have a useful operative life for periods longer than is normally known at elevated temperatures.

According to the invention a method of treating a synthetic material such as a polyamide or a polyester to render it resistant to elevated temperatures is characterized by incorporating in the material a heat stabilizing agen comprising an organic antioxidant each molecule of which contains a reactive hydrogen atom and does not become an oxidation radical on losing the hydrogen atom and replacing the hydrogen atom with a free radical obtained from the polymer.

Also according to the invention a heat resisting synthetic material such as a polyamide or a polyester is characterized in that the material contains a heat stabilizing agent comprising an organic antioxidant each molecule of which contains a reactive hydrogen atom and does not become an oxidation radical on losing the hydrogen atom and combining with a free radical obtained from the polymer.

The invention also includes articles formed of synthetic materials treated by the method of the invention and articles formed of synthetic materials according to the invention.

One such heat stabilizing agent is a secondary aromatic amine containing a reactive hydrogen atom which does not become an oxidation radical on losing the hydrogen atom and combining with a free radical obtained from the polymer.

More specifically the heat stabilizing agent may be the condensation product of dimethyl ketone and diphenylamine.

The heat stabilizing agent may be added at any point in the manufacturing cycle of the material or the article. For example it may be mixed into the melt from which the material or the article is formed or it may be applied to the finished material or the formed article.

One method of applying the heat stabilizing agent to textile material to be rendered heat resisting is by a process of padding in which the material is passed through an aqueous dispersion bath of the heat stabilizing agent, then mangling and drying the material. Other substances which it is desired to apply to the material may be incorporated in the bath without affecting the action of the heat stabilizing agent.

Another method of applying the heat stabilizing agent to textile material to be rendered heat resisting is by an exhaustion process in which the material is circulated through a bath containing the heat stabilizing agent diluted with water until the material has absorbed all or almost all the heat stabilizing agent present in the bath. The heat stabilizing agent may be present in the bath as a colloidal dispersion in the water.

Alternatively where the material or the article is impregnated with another material the heat stabilizing agent may be mixed with the other material or may be applied to the material or the article along with the other material by spraying dipping or coating.

The heat stabilizing agent may be formed into an emulsion or colloid which is applied as a coating to the material or the article, the coating being then dried.

The method of the invention where applied to yarn is applicable to continuous filament yarn and to spun staple yarn. It is also applicable to textured and untextured yarns of all tenacity ranges.

An example of the process of the invention is given below:

A 2×2 twill woven fabric was constructed with:
Warp: 35 ends/cm of 1×235/34 d.tex nylon 66
Weft: 35 picks/cm of 2×110/34 d.tex 80 tpcm nylon 66.

The woven fabric was winch scoured at 50° C. for 30 minutes in a solution comprising:
1 g/l soda ash
1 g/l non-ionic detergent
After scouring the fabric was rinsed well.

After stenter drying to 100 cm width the fabric was impregnated with 1% by weight of a heat stabilizing agent in a pad liquor containing 10 g/liter of the condensation product of dimethyl ketone and diphenylamine and dried at 115° C.

Heat ageing exposures were carried out in a fan-assisted air circulating oven and weft tensile strength (to break) was tested on 25.4 mm strips on an Instron Tensile Tester after conditioning in a standard atmosphere. The tensile test showed the following results:

Initial strength, before heat ageing=29KN per meter of width of fabric.

Strength after 14 days at 140° C.=20.3KN per meter of width of fabric.

The loss of strength is 30%. Such a loss of strength is quite acceptable in a fabric for use as a reinforcement in a moulded article such as a rubber timing belt.

For comparison a piece of the same fabric with no applied heat stabilizing agent was subjected to the same tensile test with the following results:

Initial strength, before heat ageing=29KN per meter of width of fabric.

Strength after 14 days at 140° C.=2.2KN per meter of width of fabric.

The loss of strength is 92.4% which shows that the untreated fabric would be useless in a high temperature environment.

What I claim is:

1. A method of treating an oxidation-prone synthetic polymeric textile material to render it resistant to elevated temperature in which a heat stabilizing agent comprising an organic antioxidant, each molecule of which contains a reactive hydrogen atom and does not become an oxidation radical on losing the hydrogen atom and replacing the hydrogen atom with a free radical from the polymer is diffused into the surface of the polymeric textile material.

2. A method of treating an oxidation-prone synthetic polymeric textile yarn to render it resistant to elevated temperature in which a heat stabilizing agent comprising an antioxidant, each molecule of which contains a reactive hydrogen atom and does not become an oxidation radical on losing the hydrogen atom and replacing the hydrogen atom with a free radical from the polymer is diffused into the surface of the yarn.

3. A method of treating an oxidation-prone synthetic polymeric textile material as claimed in claim 1 in which the heat stabilizing agent is the condensation product of dimethyl ketone and diphenylamine.

4. A method of treating an oxidations-prone synthetic polymeric textile yarn as claimed in claim 2 in which the heat stabilizing agent is the condensation product of dimethyl ketone and diphenylamine.

5. A method of treating an oxidation-prone synthetic polymeric textile material as claimed in claim 1 in which the process of diffusion is an exhaustion process.

6. A method of treating an oxidation-prone synthetic polymeric textile yarn as claimed in claim 2 in which the process of diffusion is an exhaustion process.

* * * * *